(12) United States Patent
Chapman

(10) Patent No.: US 11,939,981 B2
(45) Date of Patent: Mar. 26, 2024

(54) ROTARY DISC VALVE

(71) Applicant: Robert Bosch GmbH, Stuttgart (DE)

(72) Inventor: Thomas Chapman, Templeton, MA (US)

(73) Assignees: Robert Bosch LLC, Farmington Hills, MI (US); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/553,131

(22) Filed: Dec. 16, 2021

(65) Prior Publication Data

US 2023/0193906 A1 Jun. 22, 2023

(51) Int. Cl.
| F04D 15/00 | (2006.01) |
| F04B 1/0421 | (2020.01) |
| F02M 41/10 | (2006.01) |
| F04B 49/12 | (2006.01) |

(52) U.S. Cl.
CPC ........ *F04D 15/0038* (2013.01); *F04B 1/0421* (2013.01); *F02M 41/10* (2013.01); *F04B 49/128* (2013.01)

(58) Field of Classification Search
CPC ....... F01L 7/06; F01L 7/08; F01L 7/16; F01L 7/028; F01L 7/18; F01L 33/02; F01L 7/02; F16K 11/074; F16K 3/08; F16K 3/085; F16K 3/10; F16K 31/041; F16K 3/04; F16K 11/076

See application file for complete search history.

(56) References Cited

U.S. PATENT DOCUMENTS

| 1,742,828 | A | * | 1/1930 | Schmalz | F16K 3/10 251/192 |
| 4,440,382 | A | * | 4/1984 | Pruvot | F16K 3/10 251/192 |
| 4,901,977 | A | * | 2/1990 | Hendrick | F16K 31/53 74/420 |
| 5,741,005 | A | * | 4/1998 | Vaughan | C02F 1/42 251/208 |
| 10,865,896 | B2 | * | 12/2020 | Zonneveld | F16K 27/045 |
| 11,002,375 | B2 | * | 5/2021 | Marchand | F16K 11/085 |
| 11,466,786 | B2 | * | 10/2022 | Wang | F16K 5/12 |
| 2006/0137986 | A1 | | 6/2006 | Holmes et al. | |
| 2008/0258093 | A1 | | 10/2008 | Shay et al. | |

(Continued)

OTHER PUBLICATIONS

EP Search Report for EP Application No. EP22211922.4.

*Primary Examiner* — Carl C Staubach
(74) *Attorney, Agent, or Firm* — Kelly McGlashen; Maginot, Moore & Beck, LLP

(57) ABSTRACT

A rotary disc valve is used in a fluid delivery system to control flow of fluid between multiple ports of a valve housing. The valve housing may include a valve body and a lid that closes an open end of the valve body. In addition, the valve may include a diverter and seal assembly that are disposed in the valve housing. The diverter is configured to rotate about a rotational axis and to control fluid flow through the valve housing. The seal assembly provides a dynamic seal that is fluid tight within a plane that is perpendicular to the rotational axis. The diverter, the valve body and the seal assembly cooperate to define a fluid passageway that is coaxial with the rotational axis and passes through the seal assembly.

10 Claims, 9 Drawing Sheets

(56) References Cited

U.S. PATENT DOCUMENTS

| | | | |
|---|---|---|---|
| 2010/0059425 A1* | 3/2010 | Roig | C02F 1/006 |
| | | | 210/105 |
| 2017/0089474 A1 | 3/2017 | Zhan et al. | |
| 2019/0136724 A1* | 5/2019 | Wong | F16K 5/08 |
| 2019/0309862 A1* | 10/2019 | Yu | F16K 27/048 |
| 2022/0390025 A1* | 12/2022 | Chapman | F16K 27/06 |
| 2022/0390026 A1* | 12/2022 | Chapman | F16K 11/08 |
| 2022/0390027 A1* | 12/2022 | Chapman | F16K 27/065 |

* cited by examiner

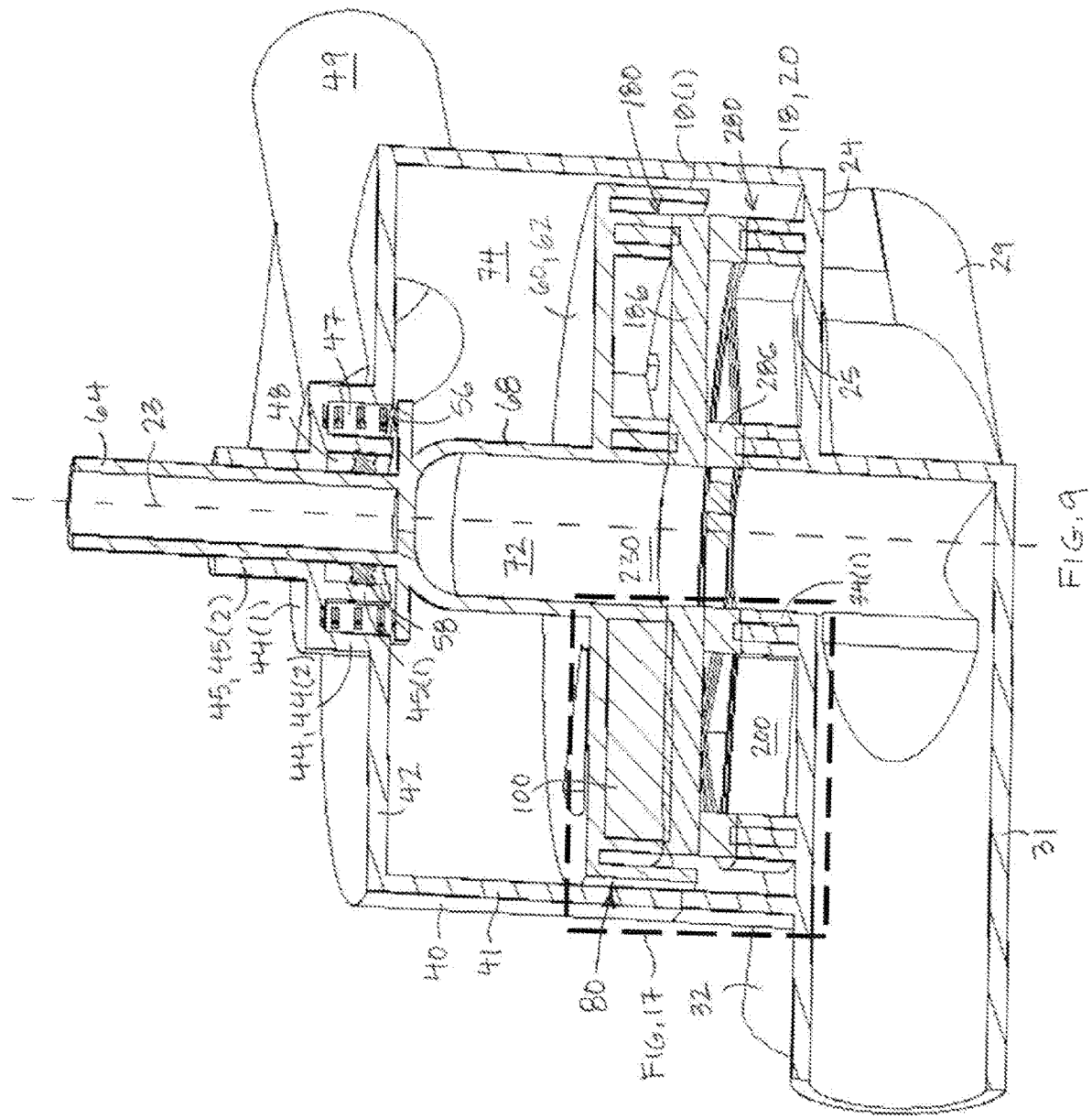

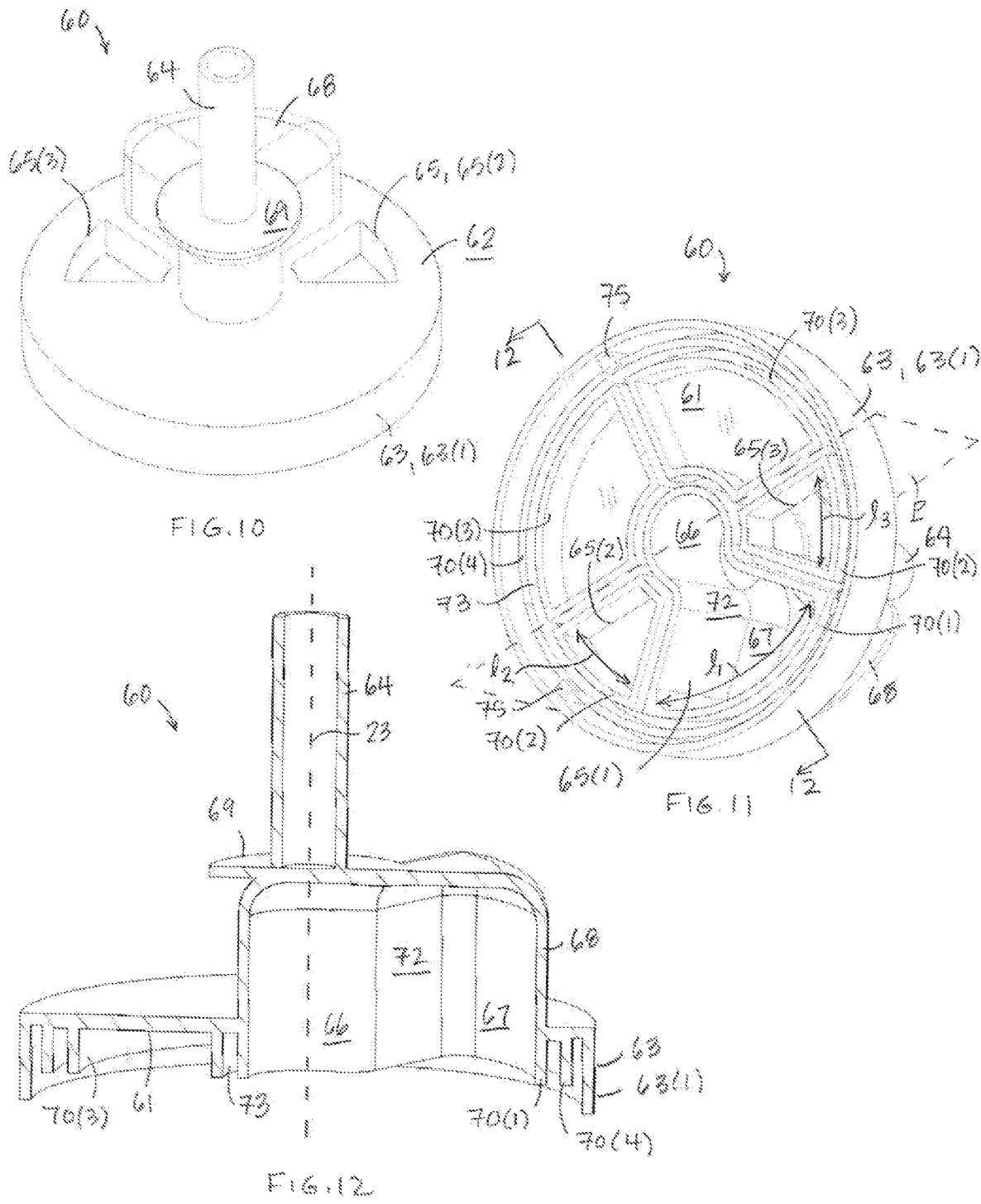

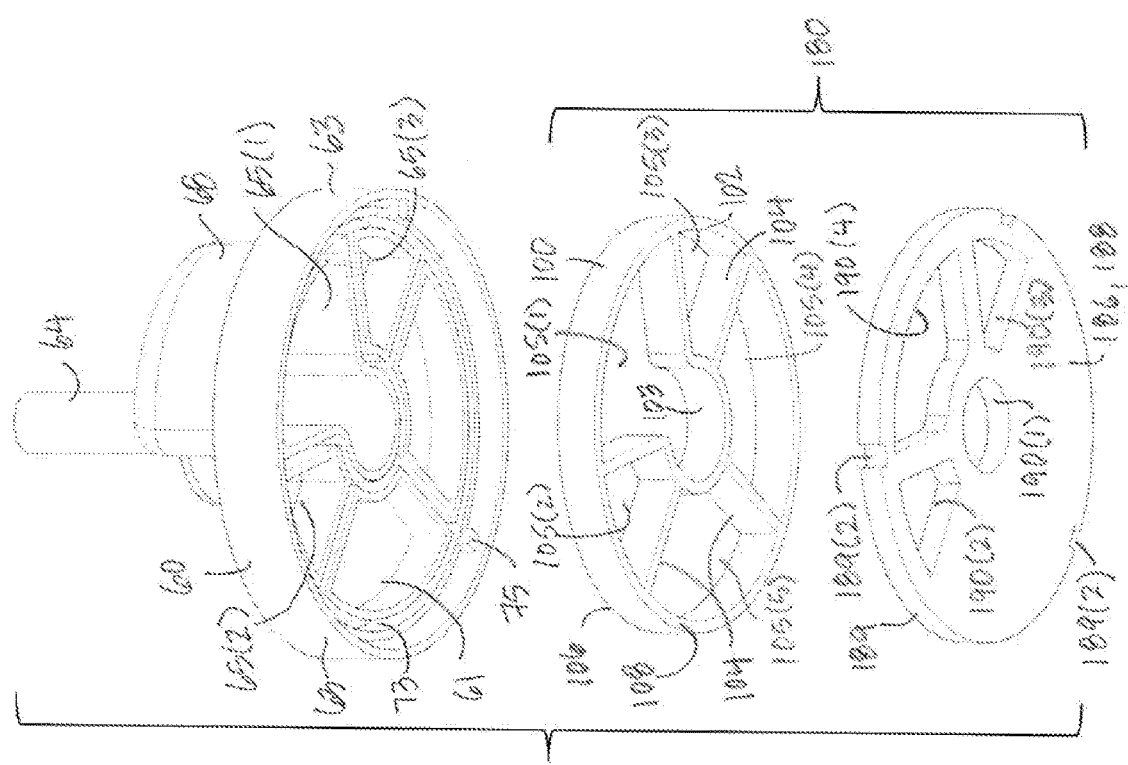
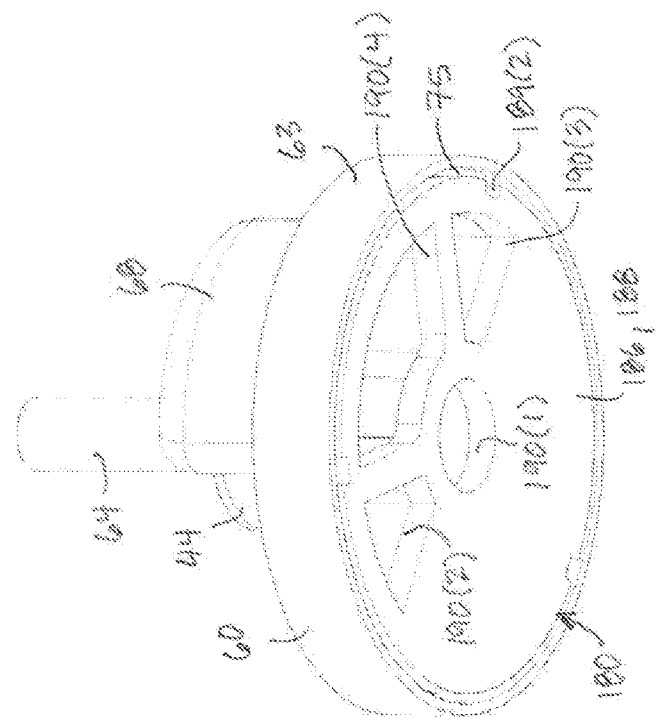
FIG. 13
FIG. 14

ROTARY DISC VALVE

BACKGROUND

A rotary valve is a type of directional control valve that may be used in a fluid delivery system to control fluid flow and distribution through the system. For example, rotary valves may be used to control the flow of coolant through a vehicle cooling system. The rotary valve may include a valve body that defines several ports and a diverter that is disposed in the valve body. The diverter is shaped to distribute the flow to predetermined ports for certain rotational orientations of the diverter within the valve body and is rotated relative to the valve body to control flow through the valve.

In some conventional rotary valves, the diverter moves against an elastomeric sealing element. However, elastomers have higher friction factors than some other conventional materials, which may result in higher required torque to rotate the valve. Other conventional rotary valves employ low fiction plastic materials. In such valves, the diverter may be cylindrical in shape. Cylindrical diverters, often referred to as "plugs", may result in higher operating torque and less flexibility in placement and orientation of the inlet and outlet tubes. Still other rotary valves use a disc-shaped diverter. Such rotary disc valves may use ceramic materials for the sealing components. However, using a ceramic disc as a diverter limits the options regarding the shape of the diverter, and can be more expensive relative to diverters formed of other materials such as plastic.

SUMMARY

Complex fluid delivery systems may require a rotary disc valve that is capable of controlling fluid flow between two, three, four or more individual ports of the valve housing. For example, a multi-port rotary disc valve may be used in a cooling system of an electric vehicle to control flow of coolant fluid between a radiator, an electric drive motor, a battery, vehicle electronics, and one or more bypass lines. The rotary disc valve may include a valve housing having a valve body, a lid that closes an open end of the valve body and multiple ports that are configured to direct a working fluid to or from the valve housing. The rotary disc valve may include a diverter that is disposed in the valve housing and is rotatable relative to the valve housing about a rotational axis. In addition, the rotary disc valve may include a seal assembly that provides a fluid tight seal between the diverter and the valve housing.

The diverter has a disc shape and can be driven to rotate about the rotational axis via an integral shaft that extends in a fluid-sealed manner through an opening in the lid. The diverter includes through openings that permit the working fluid to pass therethrough. The shape of the diverter is such that a working fluid flow path is constrained by the diverter to complete a closed flow path while another flow path goes through the through openings in the diverter and is constrained only by the valve housing.

The seal assembly includes a first sealing element that is supported on the diverter and rotates in concert with the diverter. In addition, the seal assembly includes a second sealing element that is supported on, and is fixed relative to, the valve body. The first and second sealing elements are axially stacked. Each of the first and second sealing elements includes an elastic member that forms a static seal with the respective diverter or valve body and a rigid seal plate. The seal plate of the first sealing element is designed to provide a low friction, wear resistant surface that interfaces with the corresponding low friction, wear resistant surface of the seal plate of the second sealing element. A spring is used to apply a sealing force to the diverter, which in turn drives the plate of the first sealing element against the plate of the second sealing element.

The seal assembly is sandwiched between the diverter and valve body such that the valve body, the seal assembly and the diverter are stacked in a direction parallel to the rotational axis. The valve body, the seal assembly and the diverter each have a central opening, and the respective central openings cooperate to provide an axial fluid passageway within the rotary disc valve. In certain rotational orientations of the diverter relative to the valve body, the axial fluid passageway allows coolant to pass through the valve housing between respective valve ports.

In some aspects, a valve includes a housing, a diverter, and a seal assembly. The housing includes a valve body that has a sidewall and a base that closes one end of the sidewall. The housing includes a lid that closes an open end of the valve body. The sidewall, the base and the lid cooperate to define a chamber therebetween. In addition, the housing includes valve ports, each valve port communicating with the chamber. The diverter has a disc shape and is disposed in the chamber. The diverter is rotatable relative to the valve body about a rotational axis. The diverter is configured to control fluid flow through the valve body based on a rotational orientation of the diverter relative to the valve body. The seal assembly is disposed in the chamber and provides a fluid-tight seal between the diverter and the valve body. The diverter, the valve body and the seal assembly cooperate to define a fluid passageway that is coaxial with the rotational axis and passes through the seal assembly.

In some embodiments, the diverter includes a diverter inner surface that faces toward the base and a diverter outer surface that is opposed to the diverter inner surface and faces away from the base. In addition, the diverter includes diverter through openings that extend between the diverter inner surface and the diverter outer surface, and a shaft that protrudes from the diverter in a direction perpendicular to the diverter outer surface and is concentric with the rotational axis. The shaft is configured to be driven to rotate about the rotational axis.

In some embodiments, the diverter is configured to control fluid flow through the valve body in such a way that, for certain rotational orientations of the diverter relative to the valve body, a) fluid enters the diverter via at least one diverter through opening in a first direction that is parallel to the rotational axis, and b) fluid exits the diverter via at least one diverter through opening in a second direction that is parallel to the rotational axis, the second direction being opposite the first direction.

In some embodiments, the diverter through openings include a first diverter through opening that is coincident with the rotational axis, and a second diverter through opening that is disposed between the rotational axis and a side surface of the diverter.

In some embodiments, the diverter includes a dome that overlies the first diverter through opening, and the shaft protrudes from an outer surface of the dome.

In some embodiments, the first diverter through opening includes a first portion that is coincident with the rotational axis and a second portion that is disposed between the first portion and the side surface of the diverter. The second portion is contiguous with the first portion. In addition, the diverter includes a dome that overlies the first and second portions of the first diverter through opening, the dome preventing fluid communication between the first diverter through opening and the second diverter through opening.

In some embodiments, the diverter through openings include a third diverter through opening that is disposed between the rotational axis and the side surface of the diverter. Each of the second portion, the second diverter through opening and the third diverter through opening are disposed on the same side of a plane that is perpendicular to the diverter outer surface and includes the rotational axis.

In some embodiments, the seal assembly includes a first seal subassembly and a second seal subassembly. The first seal subassembly includes a first elastic element that abuts an inner surface of the diverter and a first seal plate. The second seal subassembly includes a second elastic element that abuts an inner surface of the base and a second seal plate that abuts the first seal plate. The first elastic element has greater elasticity than the first seal plate, and the second elastic element has greater elasticity than the second seal plate. In addition, the first seal subassembly is rotatable about the rotational axis relative to the second seal subassembly.

In some embodiments, each of the first elastic element, the first seal plate, the second seal plate and the second elastic element comprise a central through opening that are coincident with the rotational axis and together form a portion of a common fluid passageway.

In some embodiments, the seal assembly includes a first seal subassembly disposed between the diverter and the base and a second seal subassembly disposed between the first seal subassembly and the base. The valve includes a first static seal formed between the first seal subassembly and the diverter, a second static seal formed between the second seal subassembly and the base, and a dynamic seal formed between the first seal subassembly and the second seal subassembly.

In some embodiments, the first seal subassembly includes a planar surface that confronts and directly contacts under axial load a planar surface of the second seal subassembly, thereby realizing the dynamic seal.

In some embodiments, the valve includes a spring disposed between the lid and the diverter, the spring biasing the diverter toward the base.

In some embodiments, at least one valve port is provided in the lid so as to reside on the same side of the seal assembly as the diverter, and at least one valve port is provided in the base so as to be disposed on an opposite side of the seal assembly relative to the diverter.

In some aspects, a valve includes a housing, a diverter, and a seal assembly. The housing includes a valve body that has a sidewall and a base that closes one end of the sidewall. The housing includes a lid that closes an open end of the valve body. The sidewall, the base and the lid cooperating to define a chamber therebetween. The housing also includes valve ports, each valve port communicating with the chamber. The diverter is disposed in the chamber and is rotatable relative to the valve body about a rotational axis. The diverter is configured to control fluid flow through the valve body based on a rotational orientation of the diverter relative to the valve body. The seal assembly is disposed in the chamber so as to reside between the diverter and the base such that the diverter. The seal assembly and the base are stacked in a direction parallel to the rotational axis. The seal assembly provides a fluid-tight seal between the diverter and the valve body. The diverter, the valve body and the seal assembly cooperate to define a fluid passageway that is coaxial with the rotational axis and passes through the seal assembly.

In some aspects, a rotary fluid valve includes a housing, and a diverter that is disposed in the housing. The diverter is rotatable relative to the housing about a rotational axis and is configured to control fluid flow through the valve body based on a rotational orientation of the diverter relative to the housing. The valve includes a seal assembly that is disposed in the housing and provides a dynamic seal that is fluid tight within a plane that is perpendicular to the rotational axis. The diverter, the valve body and the seal assembly cooperate to define a fluid passageway that is coaxial with the rotational axis and passes through the seal assembly.

BRIEF DESCRIPTION OF THE FIGURES

FIG. 9 is a cross-sectional view of the rotary disc valve as seen along line 9-9 of FIG. 2.

FIG. 10 is a top perspective view of the diverter.

FIG. 11 is a bottom perspective view of the diverter.

FIG. 12 is a cross-sectional view of the diverter as seen along line 12-12 of FIG. 11.

FIG. 13 is an exploded bottom perspective view of diverter and the first seal subassembly FIG. 14 is an assembled bottom perspective view of the diverter and the first seal subassembly.

DETAILED DESCRIPTION

Figure 1:
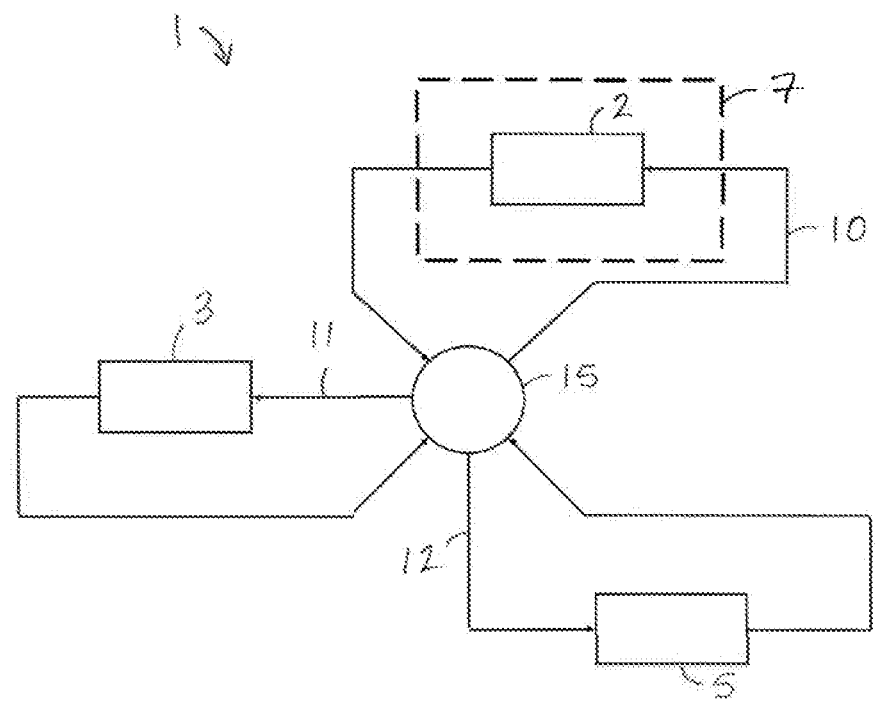
FIG. 1 is a schematic of a vehicle cooling system including a bi-level, multi-port rotary disc valve.
Figure 2:
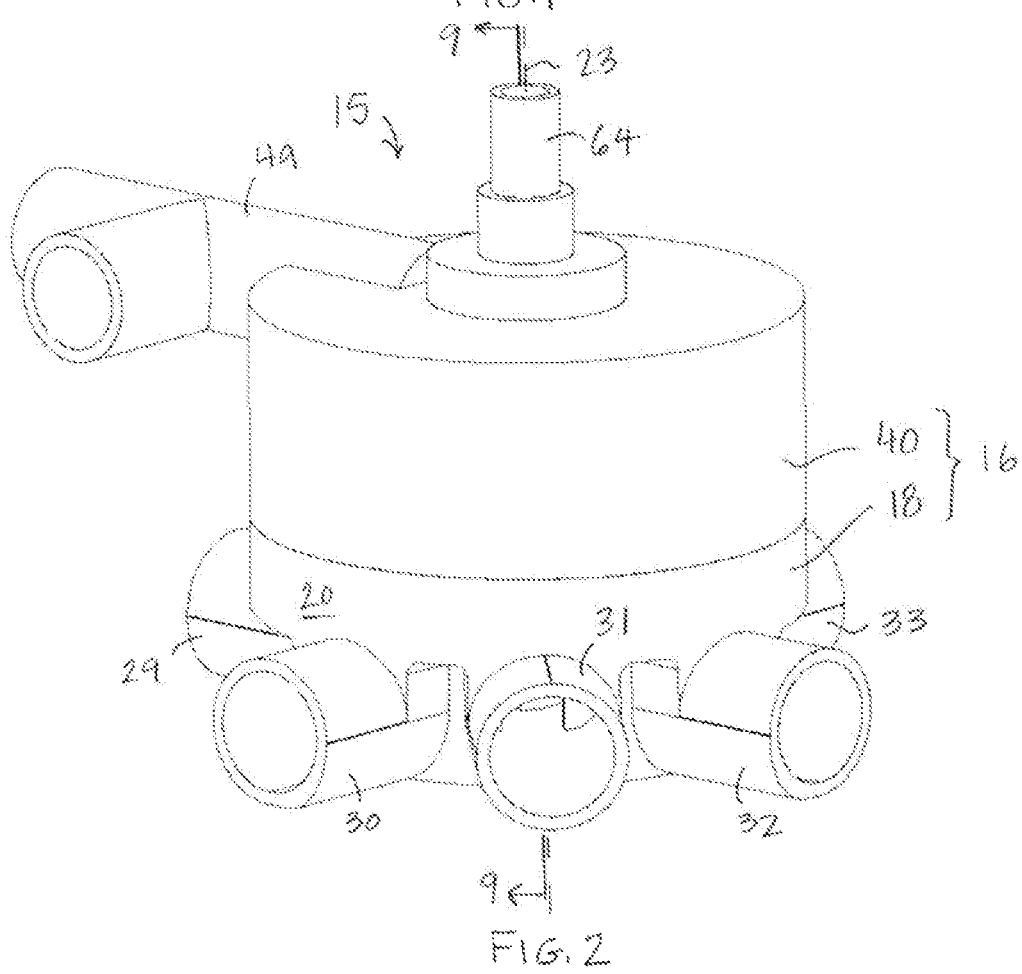
FIG. 2 is a perspective view of the rotary disc valve.
Figure 3:
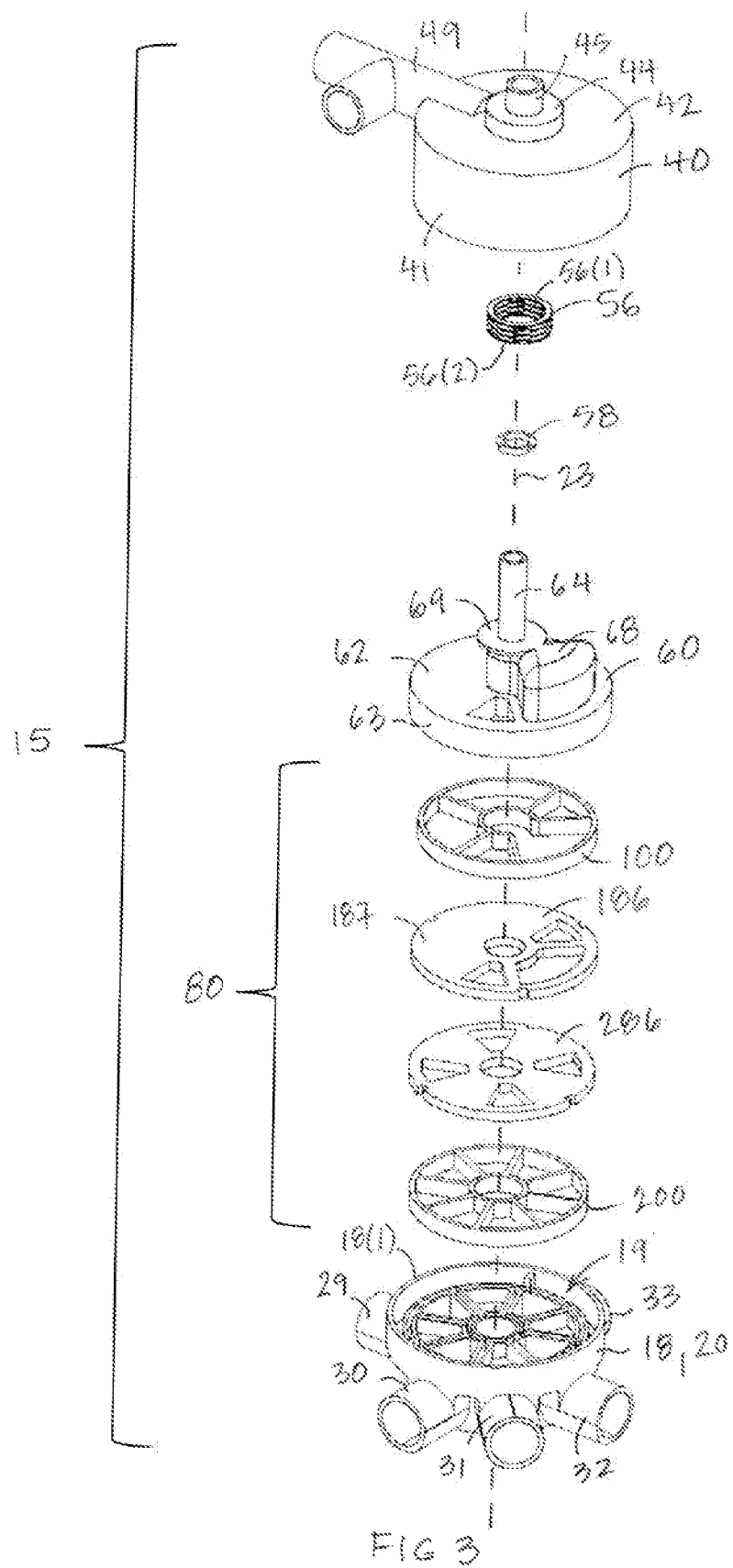
FIG. 3 is an exploded perspective view of the rotary disc valve.
Figure 4:
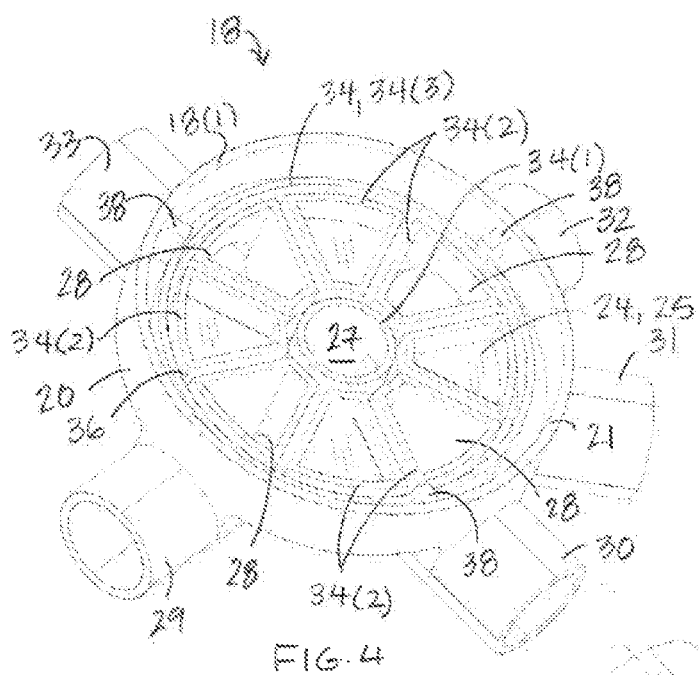
FIG. 4 is a top perspective view of the valve body.
Figure 5:
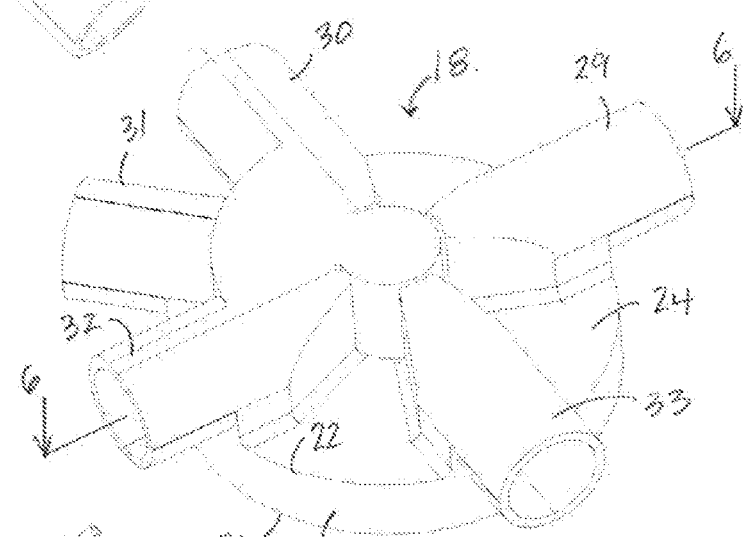
FIG. 5 is a bottom perspective view of the valve body.
Figure 6:
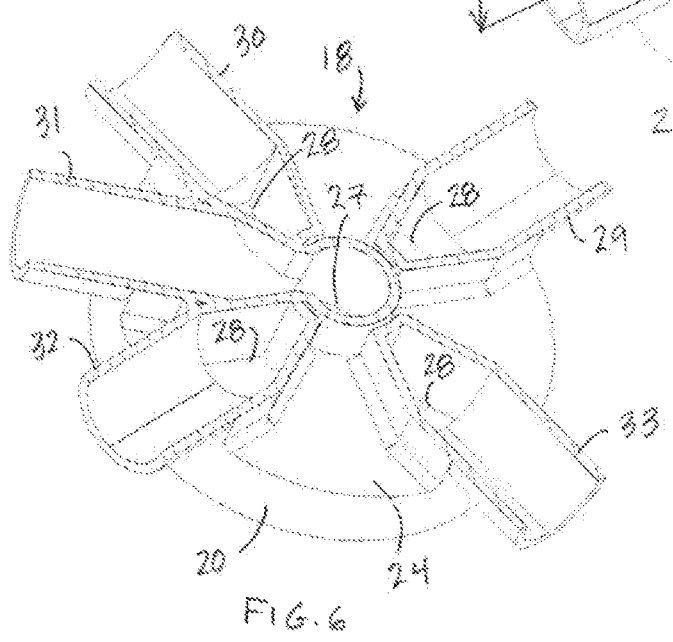
FIG. 6 is a cross-sectional view of the valve body as seen along line 6-6 of FIG. 5.
Figure 7:
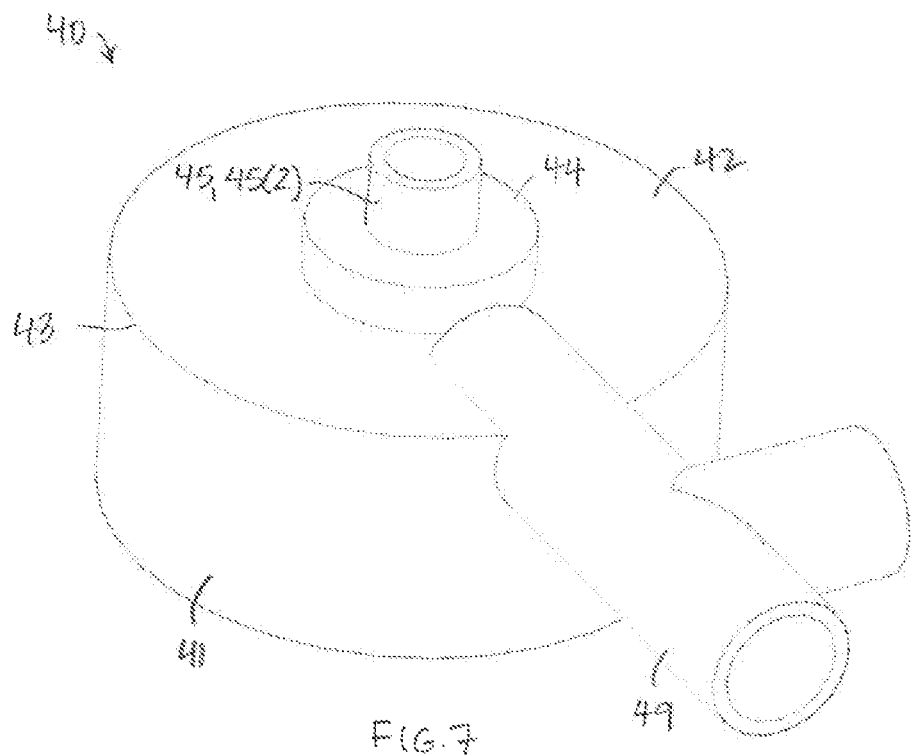
FIG. 7 is a top perspective view of the lid.
Figure 8:
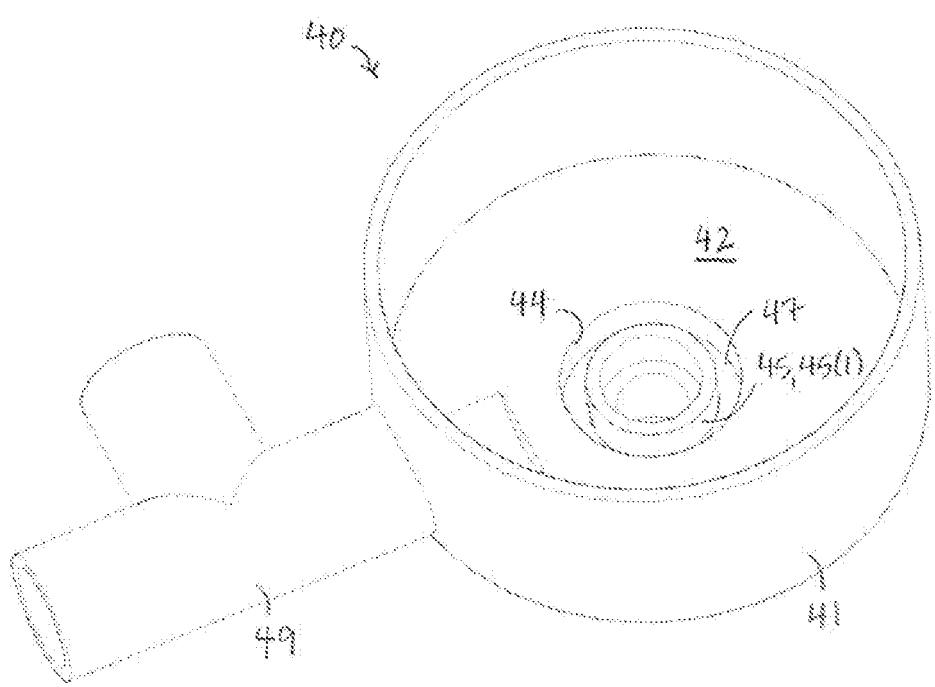
FIG. 8 is a bottom perspective view of the lid.
Figures 15, 16:
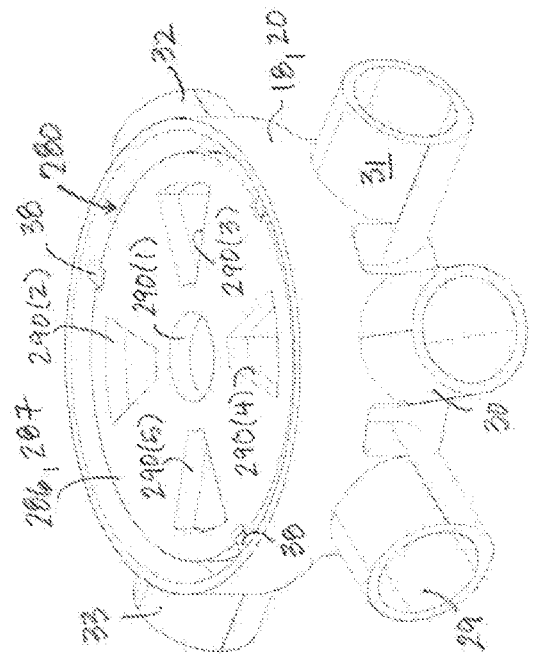
FIG. 15 is an exploded top perspective view of the valve body and the second seal subassembly.
FIG. 16 is an assembled top perspective view of the valve body and the second seal subassembly.

Referring to FIGS. 1-3, a fluid delivery system 1 includes a multi-port rotary disc valve 15 that is capable of controlling fluid flow driven by pumps 8 between two, three, four or more individual fluid lines 10, 11, 12, within the system 1. The rotary disc valve 15 may be used, for example, to control the distribution and flow of coolant in a cooling system 1 of an electric vehicle. In this example, the rotary disc valve 15 may control flow of coolant fluid via a first fluid line 10 between the rotary disc valve 15 and a radiator 2 that is part of a vehicle passenger cabin heating and cooling system 7. The rotary disc valve 15 may control flow of coolant fluid via a second fluid line 11 between the rotary disc valve 15 and a battery 3 and battery management system. In addition, the rotary disc valve 15 may control fluid flow via a third fluid line 12 to one or more heat exchangers 5 that support temperature control of other vehicle devices and systems, such as an electric drive motor, vehicle electronics and/or electronic control units and/or the oil supply.

The rotary disc valve 15 includes a valve housing 16 and a generally disc-shaped diverter 60 that is disposed in the valve housing 16. The valve housing 16 is a closed container that includes a valve body 18 and a lid 40 that closes an open end 18(1) of the valve body 18. The internal vacancy defined between the valve body 18 and the lid 40 is referred to as the valve chamber 19, and the diverter 60 is received in the valve chamber 19. The diverter 60 includes a valve shaft 64 that protrudes through the lid 40. The valve shaft 64 is configured to be connected to a valve actuator (not shown). Upon actuation, the valve shaft 64 and the diverter 60 rotate relative to the valve housing 16 about a rotational axis 23, and the rotational orientation of the diverter 60 relative to the valve housing 16 is set via the valve actuator. In addition, the rotary disc valve 15 has a seal assembly 80 that is disposed in the valve chamber 19 and provides a fluid-tight seal between the valve housing 16 and the diverter 60. The valve housing 16 includes multiple valve ports 29, 30, 31, 32, 33, 49, the number of valve ports being determined by the specific application. The rotational orientation of the diverter 60 relative to the valve housing 16 determines one or more fluid flow paths through corresponding ones of the valve ports 29, 30, 31, 32, 33, 49, whereby the distribution of coolant fluid in the cooling system 1 is controlled. Details of the rotary disc valve 15, including the valve housing 16, the diverter 60 and the seal assembly 80, will now be described.

Referring to FIGS. 2-6, the valve body 18 includes a body sidewall 20, and a base 24 that closes one end (referred to here as the "base end") 22 of the body sidewall 20. The body sidewall 20 is a hollow cylinder that is centered on the rotational axis 23 and has a circular profile when viewed in a direction parallel to the rotational axis 23. The valve body has a low profile in that the height of the body sidewall 20 is short relative to a diameter of the body sidewall 20. Although the body sidewall 20, as illustrated, is cylindrical, the body sidewall 20 is not limited to this shape. For example, the body sidewall 20 could alternatively be conical or ellipsoidal. The body sidewall 20 is joined at the base end 22 to a peripheral edge of the base 24, and the body sidewall 20 surrounds the base 24. The body sidewall 20 and the base 24 together form a generally cup-shaped structure that opens facing the lid 40.

The base 24 includes a circular central through opening 27 that is concentric with the rotational axis 23 and a centerline of the body sidewall 20. In addition, the base 24 includes peripheral through openings 28 that are circular sector-shaped and disposed between the central through opening 27 and the periphery of the base 24. The peripheral through openings 28 each have the same size and are equidistantly spaced apart about the circumference of the central through opening 27. The spaces between adjacent pairs of peripheral through openings 28 have the same size and shape as each peripheral through opening 28. In the illustrated embodiment, the base 24 includes four peripheral through openings 28.

The valve body 18 includes chamber walls 34 that protrude from the lid-facing surface of the base 24. In particular, a cylindrical inner chamber wall 34(1) encircles the central through opening 27, and intermediate chamber walls 34(2) having a circular sector-shaped profile surround each of the peripheral through openings 28 and each of the sector-shaped spaces between adjacent pairs of peripheral through openings 28. In addition, a cylindrical outer chamber wall 34(3) surrounds the intermediate chamber walls 34(2). Each chamber wall 34(1), 34(2), 34(3) has a height that is less than the height of the body sidewall 20, where the term "height" refers to the dimension in a direction parallel to the rotational axis 23. There is a channel 36 of uniform dimension between the inner chamber wall 34(1) and each of the intermediate chamber walls 34(2), and between each of the intermediate chamber walls 34(2) and the outer chamber wall 34(3). When the valve body 18 is viewed in a direction parallel to the rotational axis 23, the channel 36 has the appearance of a spoked wheel. As discussed further below, a portion of the seal assembly 80 is received in the channel 36.

The valve body 18 includes sidewall ribs 38 that protrude inward from inner surface of the body sidewall 20. The sidewall ribs 38 are spaced apart from each other along an inner circumference of the body sidewall 20. In addition, the sidewall ribs 38 are radially spaced apart from the outer chamber wall 34(3). The sidewall ribs 38 extend axially, beginning at the lid-facing surface 25 of the base 24, and terminating at a location that is spaced apart from the body sidewall open end 21, which corresponds to the open end 18(1) of the valve body 18. The sidewall ribs 38 are configured to engage with a portion of the seal assembly 80, as discussed further below.

In the illustrated embodiment, the valve body 18 includes five valve ports 29, 30, 31, 32, 33 but is not limited to this number of valve ports. Each of the valve ports 29, 30, 31, 32, 33 is a tubular structure that communicates with a respective one of the base through openings 27, 28. In particular, the valve body 18 includes a first valve port 29 that communicates with a first peripheral through opening 28(1), a second valve port 30 that communicates with a second peripheral through opening 28(2), a third valve port 31 that communicates with the central through opening 27, a fourth valve port 32 that communicates with a third peripheral through opening 28(3), and a fifth valve port 33 that communicates with a fourth peripheral through opening 28(4). Each of the valve ports 29, 30, 31, 32, 33 adjoins the base outward-facing surface and resides in a plane that is parallel to the base outward-facing surface 26. Each of the valve ports 29, 30, 31, 32, 33 extends outward along a radius of the rotational axis 23.

In the illustrated embodiment, the valve ports 29, 30, 31, 32, 33 are cylindrical tubes, and each valve port 29, 30, 31, 32, 33 has a tapered end corresponding to the size and shape of the peripheral through openings 28 to accommodate the available space near the rotational axis 23. Although, as illustrated, the valve ports 29, 30, 31, 32, 33 each generally have the same length, cross-sectional shape and dimensions, the valve ports 29, 30, 31, 32, 33 are not limited to this configuration. Moreover, the valve ports 29, 30, 31, 32, 33 are not limited to the illustrated co-planar and radially oriented configuration. For example, in other embodiments, one or more of the valve ports 29, 30, 31, 32, 33 may be non-co-planar with the other valve ports and/or may protrude from the body sidewall 20 rather than the base 24. The valve ports 29, 30, 31, 32, 33 may protrude in a direction that is parallel to the rotational axis 23, in a direction that is perpendicular to the rotational axis 23 or at any angle between perpendicular and parallel to the rotational axis 23. The valve ports 29, 30, 31, 32, 33 may protrude non-radially; an axis of a given valve port is not required to intersect the rotational axis 23. In many applications, the configuration of the valve ports 29, 30, 31, 32, 33 is determined by packaging requirements.

In the illustrated embodiment, the valve ports 29, 30, 31, 32, 33 extend radially outward so as to protrude beyond the body sidewall 20 when the valve body is viewed in a direction parallel to the rotational axis 23. The first and fourth valve ports 29, 32 extend in opposed directions along a first common diameter of the valve body 18. The second and fifth valve ports 30, 33 extend in opposed directions along a second common diameter of the valve body 18, where the second common diameter is perpendicular to the first common diameter. The second and third valve ports 30, 31 are on the opposite side of the first common diameter relative to the fifth valve port 33. In other embodiments, the valve ports 29, 30, 31, 32, 33 may have a different spacing than shown, as determined by the specific application.

Referring to FIGS. 2-3 and 7-9, the valve housing 16 includes the lid 40 that closes the open end 18(1) of the valve body 18. The lid 40 includes a lid sidewall 41, and an endwall 42 that closes one end of the lid sidewall 41. Although the endwall 42 is illustrated as being planar, the endwall 42 may have other shapes. For example, in some embodiments the endwall 42 may be concave. The lid sidewall 41 is a hollow cylinder that is centered on the rotational axis 23 and has a circular profile when viewed in a direction parallel to the rotational axis 23. The diameter of the lid sidewall 41 corresponds to the diameter of the body sidewall 20. In addition, the height of the lid sidewall 41 is greater than the height of the body sidewall 20 and less than the diameter of the lid sidewall 41. The lid sidewall 41 is joined at the endwall end 43 to a peripheral edge of the endwall 42, and the lid sidewall 41 surrounds the endwall 42. The lid sidewall 41 and the endwall 42 together form a generally cup-shaped structure that opens facing the valve body 18.

The endwall 42 of the lid 40 includes a cylindrical boss 44 that is concentric with the rotational axis 23 and protrudes from the outward-facing surface of the endwall 42. The boss 44 includes an integral cylindrical sleeve 45 that is coaxial with the rotational axis 23 and extends both inward and outward with respect to the end 44(1) of the boss 44. The sleeve 45 has a non-uniform inner diameter, and a shoulder 46 is disposed at the transition between a larger-diameter portion 45(1) and a smaller-diameter portion 45(2). The larger diameter portion 45(1) resides inside the boss 44, whereas the smaller diameter portion 45(2) is disposed outside of the boss 44. The smaller diameter portion 45(2) has an inner diameter that is dimensioned to receive the valve shaft 64 in a clearance fit, for example a running fit, whereby the smaller diameter portion 45(2) serves as a bushing of the valve shaft 64. The larger diameter portion 45(1) is concentric with a side surface 44(2) of the boss 44. The space between the larger diameter portion 45(1) and the boss side surface 44(2) defines an outer annular groove 47 that receives an elastic element such as a coil or wave spring 56. In addition, the space between the larger diameter portion 45(1) and the diverter shaft 64 defines an inner annular groove 48 that receives a shaft seal 58. The spring 56 and the shaft seal 58 are retained in their respective grooves 47, 48 by a radially extending flange 69 provided on the diverter 60 at the base of the diverter shaft 64. The spring 56 and the diverter shaft are discussed in more detail below.

The shaft seal 58 provides a fluid tight seal between the diverter shaft 46 and the lid 40. The shaft seal 58 is annular and may be formed of an elastomer that is compatible with automotive coolant, such as ethylene propylene diene monomer (EPDM). In the illustrated embodiment, the shaft seal 58 is an O-ring having an "X" cross-sectional shape. In other embodiments, the shaft seal 58 may have other cross-sectional shapes, such as, but not limited to, rectangular, oval or "I" shapes.

The lid 40 includes a valve port 49 that communicates with the valve chamber 19. In the illustrated embodiment, the valve port 49 is a cylindrical tube that protrudes from the lid sidewall 41 at a location that intersects with the lid endwall 42. Although the valve port 49 is oriented so as to extend along an axis that is perpendicular to and intersects the rotational axis 23, the valve port 49 is not limited to this configuration. For example, in other embodiments, the valve port 49 may be non-co-planar with the other valve ports 29, 30, 31, 32, 33 and/or may protrude from the endwall 42 rather than the lid sidewall 41. The valve port 49 may protrude in a direction that is parallel to the rotational axis 23, in a direction that is perpendicular to the rotational axis 23 or at any angle between perpendicular and parallel to the rotational axis 23. The valve port 49 may protrude non-radially and the axis of the valve port 49 is not required to intersect the rotational axis 23. In many applications, the configuration of the valve port 49 is determined by packaging requirements.

Referring to FIGS. 9-12, the diverter 60 is disposed in the valve chamber 19 and is rotatable relative to the valve body 18 about the rotational axis 23. The diverter 60 is generally disc shaped (e.g., is generally cylindrical and has an axial dimension that is much less than its diameter). The diverter 60 includes a diverter inner surface 61 that faces toward the base 24 and a diverter outer surface 62 that is opposite the diverter inner surface 61 and faces away from the base 24. In addition, the diverter 60 includes rim 63 that protrudes from the inner surface 61 toward the base 24 and provides a peripheral surface 63(1) that faces an inner surface of the lid sidewall 41.

The diverter 60 includes diverter through openings 65 that extend between the diverter inner surface 61 and the diverter outer surface 62, whereby fluid enters and exits the diverter 60 in a direction that is parallel to the rotational axis 23. In the illustrated embodiment, the diverter 60 includes three diverter through openings 65(1), 65(2) and 65(3).

The first diverter through opening 65(1) includes a first portion 66 that includes the rotational axis 23 and a second portion 67 that is disposed between the first portion 66 and the diverter side surface 63. When viewed in a direction parallel to the rotational axis 23, the first portion 66 has a circular profile and is concentric with the rotational axis 23. In addition, the second portion 67 has the shape of a circular sector and is disposed between the first portion 66 and the diverter side surface 63. The first and second portions 66, 67 are contiguous whereby the first and second portion 66, 67 form a single, large opening.

The second and third diverter through openings 65(2), 65(3) are not contiguous with the first diverter through opening 65(1) and the second and third diverter through openings 65(2), 65(3) are disposed between the first portion 66 and the diverter side surface 63. The second and third diverter through openings 65(2), 65(3) have a circular sector-shaped profile when the diverter 60 is viewed in a direction parallel to the rotational axis 23. The second portion 67 of the first diverter through opening 65(1) is disposed between the second diverter through opening 65(2) and the third diverter through opening 65(3) in a circumferential direction, and each of the second portion 67 the first diverter through opening 65(1) and the second and third diverter through openings 65(2). 65(3) are disposed on the same side of a plane P that is perpendicular to the diverter side surface 63 and includes the rotational axis 23.

The second and third diverter through openings 65(2), 65(3) each have a small arc length as compared to that of the first diverter through opening 65(1). For example, in the illustrated embodiment, the second portion 67 of the first diverter through opening 65(1) has an arc length $\ell 1$ in a range of 60 degrees to 120 degrees, and the second and third diverter through openings 65(2), 65(3) have an arc length $\ell 2$, $\ell 3$ in a range of 30 degrees to 60 degrees (FIG. 11).

The diverter 60 includes a dome 68 that protrudes from the diverter outer surface 62 and overlies the first diverter through opening 65(1). In particular, the dome 68 encloses a periphery of the first diverter through opening 65(1) whereby, for certain rotational positions of the diverter 60 relative to the valve body 18, fluid entering the first diverter through opening 65(1) from one valve body peripheral through opening 28 may be redirected to the valve body central through opening 27. Thus, the dome 68 provides a "closed" fluid passageway 72 within the rotary disc valve 15. Fluid exiting the diverter 60 via the first portion 66 of the first diverter through opening 65(1) is directed through the seal assembly 80 and the valve body central opening 27 and exits the valve body 18 via the third valve port 31.

The second and third diverter through openings 65(2), 65(3) are not enclosed by a dome, and for certain rotational orientations of the diverter 60 relative to the valve body 18, fluid entering one of the second and third diverter through openings 65(2), 65(3) from a respective valve body peripheral through opening 28 is constrained by the valve body 18 and lid 40, and redirected toward the valve port 49 provided in the lid 40. In other words, for certain rotational positions of the diverter 60 relative to the valve body 18, fluid entering the second diverter through opening 65(2) from a corresponding valve body peripheral through opening 28 may be redirected to the valve port 49 via an "open" fluid passageway 74 within the rotary disc valve 15, the open fluid passageway 74 passing over the diverter outer surface 62 (FIG. 9).

It is understood that the size and spacing of the first, second and third diverter through openings 65(1), 65(2), 65(3), as well as the shape and size of the dome 68, are exemplary and in practice will depend on the specific application.

The diverter 60 includes a valve shaft 64 that protrudes from an outer surface of the dome 68 in a direction perpendicular to the diverter outer surface 61. The valve shaft 64 is concentric with the rotational axis 23 and is configured to be connected to the valve actuator which drives the valve shaft 64 to rotate about the rotational axis 23. For example, in the illustrated embodiment, the outer surface of the valve shaft 64 may include flats (shown), splines or other features that permit engagement with an output structure of the valve actuator.

The diverter includes a flange 69 disposed at the intersection of the valve shaft 64 and the dome 68. The flange 69 has a circular profile when viewed in a direction that is parallel to the rotational axis 23 and has a diameter that is equal to or greater than an outer diameter of the outer annular groove 47 of the boss 44. The flange 69 is axially positioned so as to prevent the spring 56 and the shaft seal 58 from exiting their respective grooves 47, 48.

The diverter inner surface 61 includes partitioning walls 70 that protrude toward the base 24 of the valve body 18. In particular, a first partitioning wall 70(1) encloses a periphery of the first diverter through opening 65(1) and forms a continuous surface with an inner surface of the dome 68. A pair of intermediate partitioning walls 70(2) having a circular sector-shaped profile surround each of the respective second and third diverter through openings 65(2), 65(3). Another pair of intermediate partitioning walls 70(3) enclose circular sector-shaped spaces disposed between the second and third diverter through openings 65(2), 65(3) on a side of the plane P opposed to the second portion 67. In addition, a cylindrical outer partitioning wall 70(4) surrounds the intermediate partitioning walls 70(2), 70(3). Each partitioning wall 70(1), 70(2), 70(3), 70(4) has a height that is less than the height of the diverter peripheral surface 63(1), where the term "height" refers to the dimension in a direction parallel to the rotational axis 23.

The partitioning walls 70(1), 70(2), 70(3), 70(4) together form a raised pattern that matches the profile of the facing element (e.g., the first elastic element 100) of the seal assembly 80. The partitioning walls 70(1). 70(2), 70(3), 70(4) cooperate to define a wide, shallow diverter channel 73 that receives and supports a portion of the first elastic element 100 of the seal assembly 80, as discussed further below. By this configuration, the first elastic element 100 is rotationally located with respect to, and prevented from relative rotation with respect to, the diverter 60.

In addition to defining the diverter channel 73, the partitioning walls 70(1), 70(2), 70(3), 70(4) increase the structural integrity of the diverter 60, including providing increased resistance to bending or flexion of the diverter 60.

The inner surface of the rim 63 includes diverter ribs 75 that protrude inward toward the rotational axis 23. The diverter ribs 75 are spaced apart from each other along an inner circumference of the rim 63. In addition, the diverter ribs 75 are radially spaced apart from the outer partitioning wall 70(4). The diverter ribs 75 extend axially, beginning at the diverter inner surface 61, and terminating at a location that is spaced apart from the end of the rim 63. The diverter ribs 75 are configured to engage with a portion of the seal assembly 80, as discussed further below.

In the illustrated embodiment, the diverter 60 is formed of a plastic such as Polyoxymethylene (POM), Polyphenylene Sulfide (PPS), Polypropylene (PP) or Polyamide (PA).

Referring to FIGS. 3, 9 and 13-15, the seal assembly 80 is disposed in the valve chamber 19 between the diverter inner surface 61 and the base 24 of the valve body 18. More particularly, seal assembly 80 is sandwiched between the diverter inner surface 61 and the base lid-facing surface 25 and includes a first seal subassembly 180 that abuts the diverter inner surface 61 and is fixed relative to the diverter 60. In addition, the seal assembly 80 includes a second seal subassembly 280 that abuts the base 24 and is fixed relative to the base 26. The first and second seal subassemblies 180, 280 are in a stacked (e.g., layered) configuration in a direction parallel to the rotational axis 23. The components of the seal assembly 80 will now be described in detail.

Referring to FIGS. 3, 9 and 13-15, the seal assembly 80 is disposed in the valve chamber 19 between the diverter inner surface 61 and the base 24 of the valve body 18, more particularly between the diverter inner surface 61 and the lid-facing surface 25 of the base 24.

The first seal subassembly 180 is an assembly of two sealing elements. In particular, the first seal subassembly 180 includes a first seal plate 186 that is disposed between the diverter inner surface 61 and the second seal subassembly 280, and a first elastic element 100 that is disposed between the diverter inner surface 61 and the first seal plate 186. The first elastic element 100 is stacked with the first seal plate 186 in a direction parallel to the rotational axis 23.

The first seal plate 186 is a rigid cylindrical plate and includes a first plate diverter-facing surface 187 that faces toward the diverter inner surface 61, and a first plate base-facing surface 188 that faces toward the base 24. The first seal plate 186 includes a first plate peripheral surface 189 that extends between the first plate diverter-facing and base-facing surfaces 187, 188. The first plate diverter-facing and base-facing surfaces 187, 188 are planar (e.g., flat or level and smooth, without raised areas, protrusions, recesses, indentations or surface features or irregularities). The diverter-facing surface 187 also faces, and directly contacts, a corresponding facing surface 108 of the intervening first elastic element 100, as discussed in detail below.

The first seal plate 186 includes several first plate through openings 190. In particular, the first seal plate 186 includes a central through opening 190(1) having a circular profile when the first seal plate 186 is viewed in a direction parallel to the rotational axis 23. In addition, the first seal plate 186 includes three peripheral through openings 190(2), 190(3), 190(4) that are disposed between the central through opening 190(1) and the first plate peripheral surface 189. The first plate through openings 190 each extend between the first plate diverter-facing and base-facing surfaces 187, 188. The first and second peripheral through openings 190(2), 190(3) of the first seal plate 186 have a small arc length as compared to that of the third peripheral through opening 190(4). For example, in the illustrated embodiment, the first and second peripheral through openings 190(2), 190(3) have an arc length of in a range of 30 degrees to 60 degrees and the third peripheral through opening 190(4), which is disposed between the first and second peripheral through openings 190(2), 190(3) in a circumferential direction, has an arc length in a range of 60 degrees to 120 degrees. In the illustrated embodiment, the peripheral through openings 190(2), 190(3) and 190(4) are axially aligned with a corresponding one of the diverter through openings 65(1), 65(2), 65(3), and have the same shape and dimensions as that of the diverter through opening 65 with which it is aligned.

The first plate peripheral surface 189 faces inner surface of the rim 63, and thus also the body sidewall 20. Rectangular notches 189(2) are provided in the first plate peripheral surface 189. The notches 189(2) are spaced apart along the circumference of the first seal plate 186 and open facing the body sidewall 20. The notches 189(2) are shaped and dimensioned to receive a corresponding one of the diverter ribs 75 that protrude inward from inner surface of the diverter rim 63 in a clearance fit, for example a location fit. The diverter ribs 75 engage the notches 189(2), whereby the first seal plate 186 is prevented from rotating relative to the diverter 60. In the illustrated embodiment, the first peripheral surface 189 is circular when viewed in a direction parallel to the rotational axis 23 and includes three notches 189(2).

The first plate base-facing surface 188 provides one of the dynamic sealing surfaces of the seal assembly 80. In particular, the first plate base-facing surface 188 faces toward, and directly contacts, a facing surface 287 of the second seal subassembly 280. Since the first seal plate 186 rotates in concert with the diverter 260 relative to the second seal subassembly 280 during valve use, the first seal plate 186 is formed of a highly wear resistant material. For example, in the illustrated embodiment, the first seal plate 186 may be ceramic or stainless steel.

The first seal plate 186 is a thin plate in that the axial dimension, or thickness, of the first seal plate 186 is less than the dimension of the first seal plate 186 in a direction perpendicular to the axial dimension (e.g., less than the diameter of the first seal plate 186). For example, in the illustrated embodiment, the diameter of the first seal plate 186 may be in a range of 10 times the first seal plate thickness to 20 times the first seal plate thickness.

The first elastic element 100 includes a first element annular outer portion 102, a first element partially-annular inner portion 103, and first element struts 104 that extend between the first element outer portion 102 and the first element inner portion 103, giving the first elastic element 100 the appearance of a spoked wheel when viewed in a direction parallel to the rotation axis 16. The first elastic element 100 has first element through openings 105, which are defined between the first element outer and inner portions 102, 103 and each pair of adjacent first element struts 104. The first element through openings 105 are shaped, dimensioned and relatively spaced to accommodate the shape, dimensions and spacing of the diverter through openings 65(1), 65(2) and 65(3), as well as the pair of intermediate partitioning walls 70(3) provided on the diverter inner surface 61. More particularly, the first elastic element 100 includes a first through opening 105(1) that coincides with the rotational axis 23 and has the same shape and dimensions as the first diverter through opening 65(1). The first elastic element 100 includes second and third peripheral through openings 105(2), 105(3) that are aligned with, and have the same shape and dimensions as, the diverter second and third diverter through openings 65(2), 65(3). In addition, the first elastic element 100 includes third and fourth peripheral through openings 105(4), 105(5) that are aligned with, and have the same shape and dimensions as, the pair of intermediate partitioning walls 70(3) that protrude from the diverter inner surface 61.

By this configuration, the first element struts 104 are not equidistantly spaced, whereby the respective first element through openings 105 do not each have the same arc length. Certain ones of the first element through openings 105 are aligned with corresponding first plate through openings 190, and these first element through opening 105 have the same shape and dimension as the first sealing element through opening 190 with which it is aligned.

The diverter-facing surface 106 of the first elastic element 100 faces toward, and directly contacts, the diverter inner surface 61. More particularly, the first elastic element 100 is partially received in the diverter channel 73 which is shaped and dimensioned to receive the first elastic element 100 in a clearance fit, for example a sliding fit. The engagement between the surfaces of the elastic element 100 and facing surfaces of the diverter channel 73 serves to prevent relative rotation of the first elastic element 100 relative to the diverter 60. Thus, both the first elastic element 100 and the first seal plate 186 are fixed relative to the diverter 60.

The first elastic element 100 has a greater elasticity than the first seal plate 186. In addition, the first elastic element 100 is formed of an elastic material that is compatible with the fluid that flows through the rotary disc valve 15 and meets the requirements for operating temperature and durability. For example, when the rotary disc valve 15 is used to control fluid in a vehicle coolant system, the first elastic element 100 is formed of an elastomer that is compatible with automotive coolant, such as ethylene propylene diene monomer (EPDM).

In the illustrated embodiment, the first element outer portion 102, the first element inner portion 103, and the first element struts 104 of the first elastic element 100 each have a rectangular shaped cross-section.

The first elastic element 100 is thin in that the axial dimension, or thickness, of the first elastic element 100 is much less than the dimension of the first elastic element 100 in a direction perpendicular to the axial dimension (e.g., much less than the diameter of the first elastic element 100). For example, in the illustrated embodiment, the diameter of the first elastic element 100 may be in a range of 10 times the elastic element thickness to 20 times the elastic element thickness. In addition, the diameter of the first elastic element 100 is slightly less than a diameter of the first seal plate 186. In the illustrated embodiment, the thickness of the first elastic element 100 is approximately the same as the thickness of the first seal plate 186. However, in some embodiments, the thickness of the first elastic element 100 may be as much as approximately twice the thickness of the first seal plate 186.

The second seal subassembly 280 is an assembly of two sealing elements. In particular, the second seal subassembly 280 includes a second seal plate 286 that is disposed between the first seal subassembly 180 and the base 24 of the valve body 18, and a second elastic element 200 that is disposed between the second seal plate 286 and the base 24. The second seal plate 286 and the second elastic element 200 are stacked in a direction parallel to the rotational axis 23.

The second seal plate 286 is a rigid cylindrical plate and includes a second plate diverter-facing surface 287 that faces toward the diverter inner surface 61, and a second plate base-facing surface 288 that faces toward the base 24. The second seal plate 286 includes a second plate peripheral surface 289 that extends between the first plate diverter-facing and base-facing surfaces 287, 288. The second plate diverter-facing and base-facing surfaces 287, 288 are planar (e.g., flat or level and smooth, without raised areas, protrusions, recesses, indentations or surface features or irregularities). The diverter-facing surface 287 of the second seal plate 286 faces, and directly contacts, a corresponding facing surface 188 of the intervening first seal plate 186, as discussed in detail below, and the base-facing surface 288 faces, and directly contacts, a corresponding facing surface 206 of the second elastic element 200.

The second seal plate 286 includes several second plate through openings 290. In particular, the second seal plate 286 includes a central through opening 290(1) having a circular profile when the second seal plate 286 is viewed in a direction parallel to the rotational axis 23. In addition, the second seal plate 286 includes four peripheral through openings 290(2), 290(3), 290(4), 290 (5) that are disposed between the central through opening 290(1) and the second plate peripheral surface 289. The second plate through openings 290 each extend between the first plate diverter-facing and base-facing surfaces 287, 288. The four peripheral through openings 290(2), 290(3), 290(4). 290(5) each have a circular sector shape, and an arc length corresponding to that of the base peripheral through openings 28. For example, in the illustrated embodiment, the four peripheral through openings 290(2), 290(3), 290(4), 290(5) have an arc length of in a range of 30 degrees to 60 degrees. In the illustrated embodiment, four peripheral through openings 290(2), 290(3), 290(4), 290(5) equidistantly spaced from each other in a circumferential direction.

The second plate peripheral surface 289 faces the body sidewall 20. Rectangular notches 289(2) are provided in the second plate peripheral surface 289. The notches 289(2) are spaced apart along the circumference of the second seal plate 286 and open facing the body sidewall 20. The notches 289(2) are shaped and dimensioned to receive a corresponding one of the sidewall ribs 38 that protrude inward from inner surface of the body sidewall 20 in a clearance fit, for example a location fit. The sidewall ribs 38 engage the notches 289(2), whereby the second seal plate 286 is prevented from rotating relative to the valve body 18. In the illustrated embodiment, the second peripheral surface 289 is circular when viewed in a direction parallel to the rotational axis 23 and includes three notches 289(2).

The second plate diverter-facing surface 287 provides one of the dynamic sealing surfaces of the seal assembly 80. In particular, the second plate diverter-facing surface 287 faces toward, and directly contacts, a facing surface 188 of the first seal subassembly 180. Since the first seal plate 186 rotates in concert with the diverter 260 relative to the second seal subassembly 280 during valve use, the second seal plate 286 is formed of a highly wear resistive material. For example, in the illustrated embodiment, the second seal plate 286 may be ceramic or stainless steel.

The second seal plate 286 is a thin plate in that the axial dimension, or thickness, of the second seal plate 286 is less than the dimension of the second seal plate 286 in a direction perpendicular to the axial dimension (e.g., less than the diameter of the first seal plate 186). For example, in the illustrated embodiment, the diameter of the second seal plate 286 may be in a range of 10 times the second seal plate thickness to 20 times the second seal plate thickness. In the illustrated embodiment, the second seal plate 286 has approximately the same thickness as that of the first seal plate 186.

The second elastic element 200 includes an annular second element outer portion 202, an annular second element inner portion 203, and second element struts 204 that extend between the second element outer portion 202 and the second element inner portion 203, giving the second elastic element 200 the appearance of a spoked wheel when viewed in a direction parallel to the rotation axis 16.

The second elastic element 200 has second element through openings 205, which are defined between the second element outer and inner portions 202, 203 and each pair of adjacent second element struts 204. In particular, the annular second element inner portion 203 defines a central opening 205(1) having a circular profile when the second elastic element 200 is viewed in a direction parallel to the rotational axis 23. In addition, the second elastic element 200 includes eight peripheral through openings 205(2), 205(3), 205(4), 205(5), 205(6), 205(7), 205(8), 205(9) that are disposed between the inner and outer portions 202, 203. The second plate through openings 205 each extend between the second elastic element diverter-facing and base-facing surfaces 206, 208. The eight peripheral through openings 290(2), 290(3), 290(4), 290(5) each have a circular sector shape, and an are length corresponding to that of the base peripheral through openings 28. For example, in the illustrated embodiment, the four peripheral through openings 205(2), 205(3), 205(4), 205(5), 205(6), 205(7), 205(8), 205(9) have an arc length of in a range of 30 degrees to 60 degrees. In the illustrated embodiment, the respective second element peripheral through openings 205 each have the same are length. Alternating second element peripheral through openings 205 are aligned with corresponding ones of the second plate through openings 290, and each second element through opening 205 has the same shape and dimension as the second plate through opening 290 with which it is aligned.

The base-facing surface 208 of the second elastic element 200 faces toward, and directly contacts, the base lid-facing surface 25. More particularly, the second elastic element 200 rests in the valve body channel 36 which is shaped and dimensioned to receive the second elastic element 200 in a clearance fit, for example a sliding fit. The engagement between the surfaces of the second elastic element 200 and facing surfaces of the valve body channel 36 serves to prevent relative rotation of the second elastic element 200 relative to the valve body 18. Thus, both the second elastic element 200 and the second seal plate 286 are fixed relative to the valve body 18.

The second elastic element 200 has a greater elasticity than second seal plate 286. In addition, the second elastic element 200 is formed of an elastic material that is compatible with the fluid that flows through the rotary disc valve 15 and meets the requirements for operating temperature and durability. For example, when the rotary disc valve 15 is used to control fluid in a vehicle coolant system, the second elastic element 200 is formed of an elastomer that is compatible with automotive coolant, such as such as ethylene propylene diene monomer (EPDM).

In the illustrated embodiment, the second element outer portion 202, the second element inner portion 203, and the second element struts 204 of the second elastic element 200 each have a rectangular cross-sectional shape.

The second elastic element 200 is thin in that the axial dimension, or thickness, of the second elastic element 200 is much less than the dimension of the second elastic element 200 in a direction perpendicular to the axial dimension (e.g., much less than the diameter of the second elastic element 200). For example, in the illustrated embodiment, the diameter of the second elastic element 200 may be in a range of 10 times the elastic element thickness to 20 times the elastic element thickness. In addition, the diameter of the second elastic element 200 is the same as a diameter of the second seal plate 286. As illustrated, the thickness of the second elastic element 200 is approximately the same as the thickness of the second seal plate 286. However, in some embodiments, the thickness of the second elastic element 200 may be as much as approximately twice the thickness of the second seal plate 286.

Figure 17:
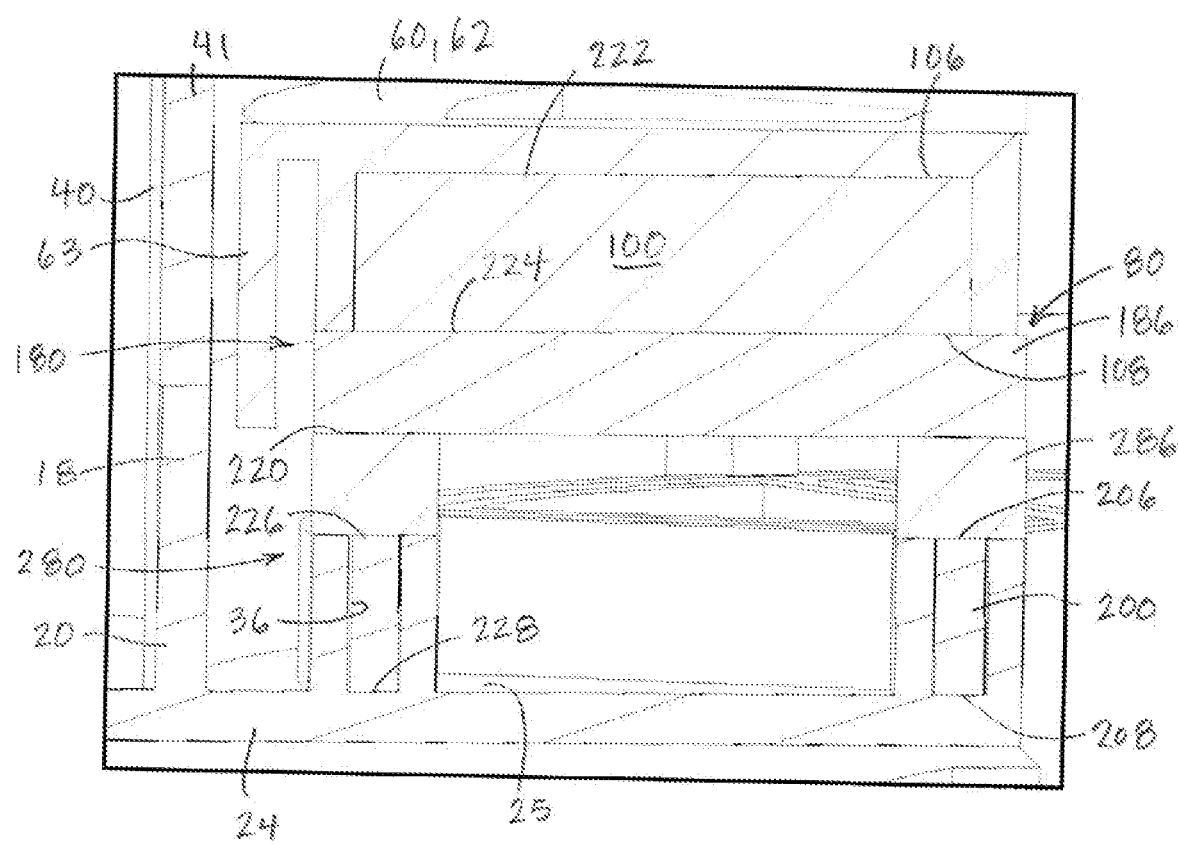
FIG. 17 is an enlargement of the portion of FIG. 9 enclosed in broken lines, illustrating the seal assembly.

Referring to FIGS. 3, 9 and 17, the rotary disc valve 15 includes the spring 56 that is disposed between the lid 40 and the flange 69 of the diverter 60. In the illustrated embodiment, the spring 56 is a coil or wave spring that surrounds the valve shaft 64. One end 56(1) of the spring 56 abuts the lid 40, and an opposed end 56(2) abuts the diverter flange 69. Within the assembly, the spring 56 is under compression, whereby the spring 56 biases the diverter 60 toward the valve body base 24 and provides a sealing force to the seal assembly 80. In particular, the spring 56 pushes the diverter 60 toward the valve body base 24 with the seal assembly 80 disposed therebetween to facilitate a fluid-tight seal within the rotary disc valve 15. In addition, the spring 56 cooperates with the relatively soft and resilient elastic elements 100, 200 to permit the seal assembly 80 to adapt to the changes in dimension caused by changes in temperature and due to wear of the diverter 60 and seal plates 186, 286.

The spring 56 pushes the diverter 60 toward the valve body base 24 with the seal assembly 280 disposed therebetween to facilitate a fluid-tight seal within the rotary disc valve 15 that consists of several static seals and a dynamic seal. The term "static seal" is used herein to refer to a seal between relatively fixed parts, whereas the term "dynamic seal" is used to refer to a seal between relatively moving parts.

In the illustrated embodiment, a fluid-tight first static seal 222 is provided between the diverter inner surface 61 and the diverter-facing surface 106 of the first elastic element 100. A fluid-tight second static seal 224 is provided between the base-facing surface 108 of the first elastic element 100 and the diverter-facing surface 187 of the first seal plate 186. A fluid-tight dynamic seal 220 is provided between the base-facing surface 188 of the first seal plate 186 and the diverter-facing surface 287 of the second seal plate 286. A fluid tight third static seal 226 is provided between the base-facing surface 288 of the second seal plate 286 and the diverter-facing surface 206 of the second elastic element 200. In addition, a fluid-tight fourth static seal 228 is provided between the base-facing surface 208 of the second elastic element 200 and the valve body channel 36.

The first seal subassembly 180 is surrounded by the diverter rim 63 and has first seal subassembly through openings 195 that are aligned with the diverter through openings 65. The second seal subassembly 280 is disposed within the valve body 18 so as to rest on the base 24 and has second seal subassembly through openings 295 that are aligned with a corresponding through opening 27, 28 of the valve body 18. In certain rotational positions of the diverter 60 relative to the valve body 18, a subset of the first and second seal subassembly through openings 195, 295 are aligned with each other.

While the first seal subassembly 180 prevents fluid flow between the seal assembly 80 and the diverter 60 and the second seal subassembly 280 prevents fluid flow between the seal assembly 80 and the valve body 18, the dynamic seal 220 is provided between abutting portions of the first and second seal subassemblies 180, 280. The dynamic seal 220 prevents fluid flow between contacting surfaces of the first and second seal subassemblies 180, 280, and retains fluid within the through openings of the seal assembly 80, where the through openings of the seal assembly 80 are constituted by aligned through openings 195, 295 of the respective first and second subassemblies 180, 280.

In the first seal subassembly 180, the central through opening 190(1) of the first seal plate 100 is axially aligned with first through opening 105(1) of the first elastic element 100. In the second seal subassembly 280, the central through opening 290(1) of the second seal plate 100 is axially aligned with the central through opening 205(1) of the second elastic element 200. Thus, the seal assembly 80 provides a portion of an axial fluid passageway that passes through the first portion 66 of the diverter 60 and the base central opening 27. Thus, the diverter 60, the valve body 18 and the seal assembly 80 cooperate to define a fluid passageway that is coaxial with the rotational axis 23 and passes through the dynamic seal 220 of the seal assembly 80.

In the rotary disc valve 15, the diverter 60 and the lid valve port 49 are disposed on a first side of the seal assembly 80 and the valve body valve ports 29, 30, 31, 32, 33 are disposed on a second, opposed side of the seal assembly 80. In addition, the diverter 60 is configured to control fluid flow through the valve body 18 in such a way that fluid enters the diverter 60 in a first direction D1 that is parallel to the rotational axis 23.

For example, fluid that enters a valve port 31 passes through a corresponding valve body peripheral through opening 28 and corresponding seal assembly through openings 205(3), 290(3), 190(3). 105(3) and enter a corresponding diverter through opening 65 while moving axially in the first direction D1. Within the diverter 60, fluid enters the diverter through opening 65(1) at the diverter inner surface 61 and exits the diverter through opening 65 at the diverter outer surface 62. Depending on the diverter through opening 65 and the rotational position of the diverter 60 relative to the valve body 18, the fluid may then pass through either the first (closed) fluid passageway 72 or the second (open) fluid passageway 74 to another diverter through opening 65. In this example, the fluid passes through the first diverter through opening 65(1) into the dome 68 and is redirected to the axial passageway 230 via the closed fluid passageway 72. The axial passageway 230 includes the first portion 66 of the diverter through opening 65(1), the central through openings 105(1), 190(1), 290(1), 205(1) of the seal assembly and the central through opening 27 of the valve body 18. The fluid moves through the axial passageway 230 in a second direction D2 that is parallel to the rotational axis 23 and opposite to the first direction D1. The fluid exiting the axial passageway 230 (and the valve body 18) is directed to the corresponding valve body port 31.

In this example, fluid that enters another valve port 29 passes through a corresponding valve body peripheral through opening 28 and corresponding seal assembly through openings 205(3), 290(3), 190(3), 105(3) and enter a corresponding diverter through opening 65 while moving axially in the first direction D1. Within the diverter 60, fluid enters the diverter through opening 65(2) at the diverter inner surface 61 and exits the diverter through opening 65(2) at the diverter outer surface 62. The fluid flows over a portion of the diverter outer surface before exiting the valve housing via the lid valve port 49.

By this configuration, between entering and exiting the diverter 60, fluid flows over a portion of the diverter outer surface 62 via the first fluid passage 72 and/or the second fluid passage 74. It is understood that fluid flow through the rotary disc valve 15 is not limited to the paths and or directions D1, D2 described in the above example, and will depend on the rotational orientation of the diverter 60 relative to the valve body 18 and the requirements of the specific application.

In the illustrated embodiments, a lid 40 is provided that closes the open end 18(1) of the valve body 18. However, in other embodiments (not shown), the lid 40 may be omitted and the open end 18(1) of the valve body 18 may be closed by a housing of the valve actuator or other ancillary structure.

The rotary disc valve 15 described above is exemplified by a dynamic seal 220 in which the components of the dynamic seal (e.g., the first and second seal plates 186, 286) are highly wear resistant materials such as ceramic or stainless steel. However, in other embodiments, the components of the dynamic seal may be formed of other materials such as a wear resistant plastic.

In the illustrated embodiment, the base 24 of the valve body 18 includes four peripheral through openings 28 that each have the same size and are equidistantly spaced apart about the circumference of the central through opening 27. However, the through openings 28 are not required to have the same size and spacing. Rather, the sizes and spacings can be different, and are determined by the functional switching requirements of the specific application.

In the illustrated embodiment, the diameter of the lid sidewall 41 corresponds to the diameter of the body sidewall 20 and the height of the lid sidewall 41 is greater than the height of the body sidewall 20 and less than the diameter of the lid sidewall 41. However, the lid 40 is not limited to this configuration. For example, in some applications the height of the body sidewall 20 may be greater than that of the lid sidewall 41.

Although the illustrated embodiment includes a single valve port 49 that protrudes from the lid 40, the lid 40 is not limited to this configuration. For example, in some embodiments, the lid 40 may include more than one valve port, whereas in other embodiments the lid 40 may have no valve ports.

In the exemplary seal assembly 80 described above, the elastic elements 100, 200 have been described as having a rectangular cross-section. However, it is understood that other cross-sectional shapes may be employed to optimize the material properties of the elastic elements 100, 200 for a given application. In addition to material selection, the softness and resilience of the elastic elements 100, 200 may be further increased and/or optimized by providing the first element outer and inner portions 102, 103, 202, 203 and the first element struts 104, 204 with an alternative cross-sectional shape. For example, in some embodiments, the elastic elements 100, 200 may have an oval, circular or other polygonal cross-sectional shape. In other embodiments, the elastic elements 100, 200 may have an irregular cross-sectional shape such as an I-shape, X-shape, etcetera.

Selective illustrative embodiments of the fluid delivery system including the rotary disc valve are described above in some detail. It should be understood that only structures considered necessary for clarifying the fluid delivery system and the rotary disc valve have been described herein. Other conventional structures, and those of ancillary and auxiliary components of the fluid delivery system and the rotary disc valve, are assumed to be known and understood by those skilled in the art. Moreover, while a working example of the fluid delivery system and the rotary disc valve have been described above, the fluid delivery system and the rotary disc valve are not limited to the working example described above, but various design alterations may be carried out without departing from the fluid delivery system and/or the rotary disc valve as set forth in the claims.

I claim:

1. A valve including a housing, a diverter, and a seal assembly, the housing comprising: a valve body, valve body including a sidewall, and a base that closes one end of the sidewall, a lid that closes an open end of the valve body, the sidewall, the base and the lid cooperating to define a chamber therebetween, and valve ports, each valve port communicating with the chamber; and the diverter having a disc shape and being disposed in the chamber, the diverter being rotatable relative to the valve body about a rotational axis, the diverter configured to control fluid flow through the valve body based on a rotational orientation of the diverter relative to the valve body, the seal assembly being disposed in the chamber and providing a fluid-tight seal between the diverter and the valve body, wherein the diverter, the valve body and the seal assembly cooperate to define a fluid passageway that passes through the seal assembly, and portions of the fluid passageway defined by each of the diverter, the valve body and the seal assembly are coaxial with the rotational axis;

wherein the diverter includes a diverter inner surface that faces toward the base, a diverter outer surface that is opposed to the diverter inner surface and faces away from the base, diverter through openings that extend between the diverter inner surface and the diverter outer surface, and a shaft that protrudes from the diverter in a direction perpendicular to the diverter outer surface and is concentric with the rotational axis, the shaft configured to be driven to rotate about the rotational axis;

wherein the diverter through openings include a first diverter through opening that is coincident with the rotational axis, and a second diverter through opening that is disposed between the rotational axis and a side surface of the diverter;

wherein the first diverter through opening includes: a first portion that is coincident with the rotational axis; and a second portion that is disposed between the first portion and the side surface of the diverter, the second portion being contiguous with the first portion, and the diverter includes a dome that overlies the first and second portions of the first diverter through opening, the dome preventing fluid communication between the first diverter through opening and the second diverter through opening.

2. The valve of claim 1, wherein the diverter is configured to control fluid flow through the valve body in such a way that, for certain rotational orientations of the diverter relative to the valve body, a) fluid enters the diverter via at least one diverter through opening in a first direction that is parallel to the rotational axis, and b) fluid exits the diverter via at least one diverter through opening in a second direction that is parallel to the rotational axis, the second direction being opposite the first direction.

3. The valve of claim 1, wherein the diverter includes a dome that overlies the first diverter through opening, and the shaft protrudes from an outer surface of the dome.

4. The valve of claim 1, wherein the diverter through openings include a third diverter through opening that is disposed between the rotational axis and the side surface of the diverter, and each of the second portion, the second diverter through opening and the third diverter through opening are disposed on the same side of a plane that is perpendicular to the diverter outer surface and includes the rotational axis.

5. The valve of claim 1, wherein the seal assembly comprises a first seal subassembly and a second seal subassembly,
the first seal subassembly comprising:
  a first elastic element that abuts an inner surface of the diverter; and
  a first seal plate, and
the second seal subassembly comprising:
  a second elastic element that abuts an inner surface of the base; and
  a second seal plate that abuts the first seal plate,
wherein
  the first elastic element has greater elasticity than the first seal plate, and the second elastic element has greater elasticity than the second seal plate,
  the first seal subassembly is rotatable about the rotational axis relative to the second seal subassembly.

6. The valve of claim 5, wherein
each of the first elastic element, the first seal plate, the second seal plate and the second elastic element comprise a central through opening that is coincident with the rotational axis and together form the portion of the fluid passageway defined by the seal assembly.

7. The valve of claim 1, wherein
the seal assembly comprises:
  a first seal subassembly disposed between the diverter and the base; and
  a second seal subassembly disposed between the first seal subassembly and the base, and
the valve comprises:
  a first static seal formed between the first seal subassembly and the diverter,
  a second static seal formed between the second seal subassembly and the base, and
  a dynamic seal formed between the first seal subassembly and the second seal subassembly.

8. The valve of claim 7, wherein the first seal subassembly includes a planar surface that confronts and directly contacts under axial load a planar surface of the second seal subassembly, thereby realizing the dynamic seal.

9. The valve of claim 1, the valve comprising:
  a coil spring disposed between the lid and the diverter, the spring biasing the diverter toward the base.

10. The valve of claim 1, wherein at least one valve port is provided in the lid so as to reside on the same side of the seal assembly as the diverter, and at least one valve port is provided in the base so as to be disposed on an opposite side of the seal assembly relative to the diverter.

* * * * *